(12) United States Patent
Charbonnier et al.

(10) Patent No.: US 11,110,897 B2
(45) Date of Patent: Sep. 7, 2021

(54) ASSEMBLY FOR CONNECTING A WINDSCREEN WIPER DRIVE ARM TO A VEHICLE DRIVE SHAFT

(71) Applicant: Valeo Systèmes d'Essuyage, Le Mesnil Saint Denis (FR)

(72) Inventors: Richard Charbonnier, Issoire (FR); Benjamin Chabannes, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 140 days.

(21) Appl. No.: 16/524,988

(22) Filed: Jul. 29, 2019

(65) Prior Publication Data
US 2020/0031317 A1 Jan. 30, 2020

(51) Int. Cl.
*B60S 1/34* (2006.01)
*B60S 1/04* (2006.01)
*F16D 1/06* (2006.01)

(52) U.S. Cl.
CPC .............. *B60S 1/3481* (2013.01); *B60S 1/04* (2013.01); *B60S 1/3436* (2013.01); *F16D 1/06* (2013.01); *B60S 1/3493* (2013.01)

(58) Field of Classification Search
CPC .... B60S 1/3484; B60S 1/3481; B60S 1/3479; B60S 1/345; B60S 1/34; B60S 1/04; B60S 1/3493; B60S 1/3436; F16D 1/06
(Continued)

(56) References Cited

U.S. PATENT DOCUMENTS

| 6,665,903 B2 * | 12/2003 | Tsukamoto | ........... B60S 1/3481 |
| | | | 15/250.34 |
| 2002/0152575 A1 | 10/2002 | Tsukamoto et al. | |
| 2007/0136975 A1 | 6/2007 | Van De Rovaart | |

FOREIGN PATENT DOCUMENTS

| DE | 2637126 | * 2/1977 |
| FR | 3030410 A1 | 6/2016 |

(Continued)

OTHER PUBLICATIONS

Preliminary Search Report issued in corresponding French Patent Application No. 1857068, dated Mar. 15, 2019 (20 pages).

(Continued)

*Primary Examiner* — Gary K. Graham
(74) *Attorney, Agent, or Firm* — Osha Bergman Watanabe & Burton LLP

(57) ABSTRACT

The invention relates to an assembly (200) for connecting a windscreen wiper drive arm to a vehicle drive shaft, the connection assembly (200) comprising at least one fixing device (220) configured to rotatably connect the drive arm to the drive shaft and at least one cover (210) mounted pivotably on the fixing device (220) by means of a pivoting connection (600), the cover (210) being configured to adopt a closed position in which it prohibits access to a fixing zone (300) between the fixing device (220) and the drive shaft or an open position in which it permits access to the fixing zone (300) between the fixing device (220) and the drive shaft, this pivoting connection (600) comprising at least one bore and at least one trunnion received in the bore, characterized in that the connection assembly (200) comprises at least one device for locking the open position of the cover (210), this locking device being arranged on the inner perimeter of the bore and on the outer perimeter of the trunnion.

12 Claims, 5 Drawing Sheets

(58) Field of Classification Search
USPC .................. 15/250.34, 250.351, 250.352
See application file for complete search history.

(56) References Cited

FOREIGN PATENT DOCUMENTS

| | | | |
|---|---|---|---|
| JP | 2001247015 A | | 9/2001 |
| JP | 2002-2455 | * | 1/2002 |
| JP | 2005-193786 | * | 7/2005 |
| JP | 2017065447 A | | 4/2017 |

OTHER PUBLICATIONS

European Search Report in corresponding European Application No. 19 18 3877, dated Dec. 3, 2019 (7 pages).

* cited by examiner

ASSEMBLY FOR CONNECTING A WINDSCREEN WIPER DRIVE ARM TO A VEHICLE DRIVE SHAFT

The invention relates to the field of wiping the glazed surfaces of a vehicle, in particular a motor vehicle, and more particularly to a connection assembly making it possible to connect a windscreen wiper drive arm and a drive shaft of the vehicle.

Motor vehicle wiper systems are designed to remove, by sweeping, liquids and dirt that can disrupt the driver's vision of his environment. These wiper systems generally comprise at least one drive arm rotated by a drive shaft of the vehicle that performs an angular back-and-forth movement on a glazed surface of the vehicle, and at least one windscreen wiper provided with a wiper blade made from a flexible plastic material and driven by the drive arm. By rubbing against this glazed surface, the wiper blade scrapes the water and a certain amount of dirt to remove them from the driver's field of vision.

Regardless of the configuration of the windscreen wiper, the drive arm is connected to the drive shaft that rotates it by means of a fixing device. This fixing device thus contributes to forming a fixing zone between the drive arm and the drive shaft. For aesthetic reasons in particular, but also to avoid excessively rapid deterioration of this fixing zone, a cover is conventionally pivotably mounted on the fixing device. This cover can adopt a closed position in which it prohibits access to this fixing zone, thus protecting it from wear, and an open position in which it permits access to this fixing zone in order to enable the positioning of fixing means that make it possible to fix the fixing device to the drive shaft.

Such a cover conventionally comprises means of locking the closed position thereof, i.e. the position that it adopts once the fixing device has been fixed to the drive shaft. One drawback of the existing covers lies in the fact that they are not provided with means of locking the open position, so that the positioning of the fixing means providing the connection between the fixing device and the drive shaft is complex and requires the involvement of at least two people, one of whom has to hold the cover while the other positions the fixing means.

The present invention arose against this backdrop and proposes simple, low-cost means making it possible to hold the cover in its open position so that a single person is capable of fixing the drive arm to the drive shaft, both on original mounting and when the drive arm is changed during the life of the vehicle.

An object of the present invention thus relates to an assembly for connecting a windscreen wiper drive arm to a drive shaft of a vehicle, the connection assembly comprising at least one fixing device configured to rotatably connect the drive arm to the drive shaft and at least one cover pivotably mounted on the fixing device by means of a pivoting connection, the cover being configured to adopt a closed position in which it prohibits access to a fixing zone between the fixing device and the drive shaft and an open position in which it permits access to the fixing zone between the fixing device and the drive shaft, this pivoting connection comprising at least one bore and at least one trunnion received in the bore. According to the invention, the connection assembly comprises at least one device for locking the open position of the cover, this locking device being arranged on the inner perimeter of the bore and on the outer perimeter of the trunnion.

In other words, at least one portion of the outer perimeter of the trunnion is configured to engage with at least one portion of the inner perimeter of the bore, this engagement resulting in the locking of the open position of the cover.

According to the invention, the trunnion comprises at least two deformable prongs connected to each other by a bridge of material. In other words, the trunnion is C-shaped when seen from the bore that receives this trunnion.

Advantageously, the end of at least one of the prongs of the trunnion has a bevel. Even more advantageously, one end of each of the prongs of the trunnion has a bevel. These bevelled ends in particular facilitate the insertion of the trunnion into the bore. According to a particular configuration of the present invention, these bevels are made in a plane parallel to a plane that passes through the middle of the prongs, i.e. in a plane in which each point is located equidistant from each of the prongs.

According to one feature of the present invention, a block is made on at least part of the outer perimeter of the trunnion, a zone of the outer perimeter of the trunnion not provided with this block at least partially defining the space made between the outer perimeter of the trunnion and the inner perimeter of the bore. Alternatively, the block can be arranged on a part of the inner perimeter of the bore, a zone of the inner perimeter of the bore not provided with this block then at least partially defining the space made between the outer perimeter of the trunnion and the inner perimeter of the bore. According to another alternative, provision can be made for a first block to be made on the inner perimeter of the trunnion and a second block to be made on the outer perimeter of the bore, a zone of the inner perimeter of the bore not provided with this block and a zone of the outer perimeter of the trunnion not provided with this block then both defining the space made between the inner perimeter of the bore and the outer perimeter of the trunnion.

According to a particular example of the present invention, the at least one trunnion is made on the cover and the at least one bore is made in the fixing device. Advantageously, the cover can comprise two trunnions and the fixing device can comprise two bores, each bore being configured to receive one of the trunnions. It will be understood that each trunnion can then comprise two deformable prongs, one end of each prong having a bevel. According to the invention, at least two cutaways can be made between an upper edge of a wall of the fixing device in which the bore is made and an edge of this bore that at least partially defines an opening of this bore through which the trunnion is inserted into this bore. Advantageously, these cutaways thus form a guide for inserting the trunnion into the bore.

Alternatively, provision can be made for the bore(s) to be made in the cover and the trunnion(s) to be made on the fixing device.

According to a first embodiment of the present invention, the device for locking the open position of the cover comprises at least a first stop made on the inner perimeter of the bore and at least a second stop made on the outer perimeter of the trunnion. It will then be understood that the engagement of this first stop with this second stop makes it possible to lock the open position of the cover. "Engagement" is given to mean the fact that one of these stops passes over the other, the first stop and the second stop then being held pressing against each other. In other words, it will be understood that the first stop forms a stop for the second stop, and vice versa.

According to one feature of this first embodiment, the second stop is made at one end of at least one of the prongs of the trunnion. Advantageously, this second stop is made in the zone of the outer perimeter of the trunnion not provided with the block.

According to the first embodiment, the first stop can for example be formed by a first boss and the second stop can be formed by a second boss. Here, "boss" is given to mean a deformation of material. In other words, the first stop is formed by a deformation of the inner perimeter of the bore and the second stop is formed by a deformation of the outer perimeter of the trunnion. The first boss and the inner perimeter of the bore thus form an integral assembly, i.e. an assembly that cannot be separated without resulting in damage to the first boss or the inner perimeter of the bore, and the second boss forms another integral assembly with the outer perimeter of the trunnion.

According to the invention, the bore has a substantially cylindrical shape. According to one feature of the first embodiment of the present invention, the first boss extends parallel to an axis of revolution of the bore, from an edge that defines the opening of the bore through which the trunnion is inserted into the bore. According to a particular configuration of this first embodiment, the first boss thus extends over an entire dimension of the bore.

According to the invention, the trunnion emerges from a base from which it extends mostly along a main axis of extension. According to the first embodiment of the present invention, the second boss extends from this base, parallel to the main axis of extension of the trunnion. For example, this base can be integrally formed with the cover, i.e. the cover and the base form a single assembly that cannot be separated without resulting in damage to the cover or the base. Advantageously, the trunnion is also integrally formed with the base, the base, the trunnion and the cover then forming a single assembly that cannot be separated without resulting in damage to one of these three elements.

According to a second embodiment of the present invention, the locking device comprises at least one flat section made on the inner perimeter of the bore, and at least one prong of the trunnion, the flat section being configured to press against this at least one prong. Advantageously, the pressure of the flat section on at least one of the prongs of the trunnion combined with the deformability of this prong brings the two prongs of the trunnion towards each other. In other words, a distance measured between two points of the prongs is smaller when the flat section is pressing against the prong than when it is not. More specifically, the prong of the trunnion is elastically deformable so that once it has been brought towards the other prong by the pressure exerted by the flat section, this prong tends to return to its initial position, thus providing the locking of the open position of the cover. In other words, the locking of the open position of the cover according to this second embodiment is provided by friction between one of the prongs of the trunnion and the flat section made on the inner perimeter of the bore.

According to one feature of the second embodiment of the present invention, when the cover is in the closed position, at least one straight line intersecting the flat section passes between the prongs of the trunnion. Advantageously, this straight line passes through the middle of these two prongs, i.e. any point of this straight line is equidistant from each of these prongs.

The present invention also relates to a wiper system comprising at least one windscreen wiper intended for coming into contact with a glazed surface of a motor vehicle, at least one drive arm configured to rotate the windscreen wiper, the drive arm being connected to a drive shaft of the vehicle by a connection assembly according to the invention. According to a particular configuration of the present invention, the windscreen wiper is intended for coming into contact with a rear window of the vehicle.

Further details, features and advantages will become apparent on reading the detailed description given below with reference to the various embodiments illustrated in the following figures.

In the description below, the terms longitudinal and transverse refer to the orientation of a fixing device of a connection assembly according to the invention. The longitudinal direction corresponds to a main direction of extension of the fixing device, this longitudinal direction being parallel to a longitudinal axis L of a three-dimensional reference system L, V, T shown in the figures; a transverse direction corresponds to a direction parallel to a transverse axis T of this three-dimensional reference system, this transverse axis T being perpendicular to the longitudinal axis L. A vertical direction corresponds to a direction parallel to a vertical axis V of the three-dimensional reference system, the vertical axis V being perpendicular to the longitudinal axis L and the transverse axis T.

The terms "upper", "lower", "top" and "bottom" refer to an orientation of the connection assembly when it is incorporated into a wiper system on a vehicle, the terms "upper" and "top" referring to positions along the vertical axis V of the three-dimensional reference system furthest from the glazed surface of the vehicle and the terms "lower" and "bottom" referring to positions along the vertical axis V closest to the glazed surface of this vehicle.

The transverse cross-sections mentioned below are taken along cutting planes that contain the transverse axis T and the vertical axis V of the three-dimensional reference system shown in the figures. The longitudinal cross-sections are taken along a plane that contains the longitudinal axis L and the vertical axis V of the three-dimensional reference system shown in the figures.

Figure 1:
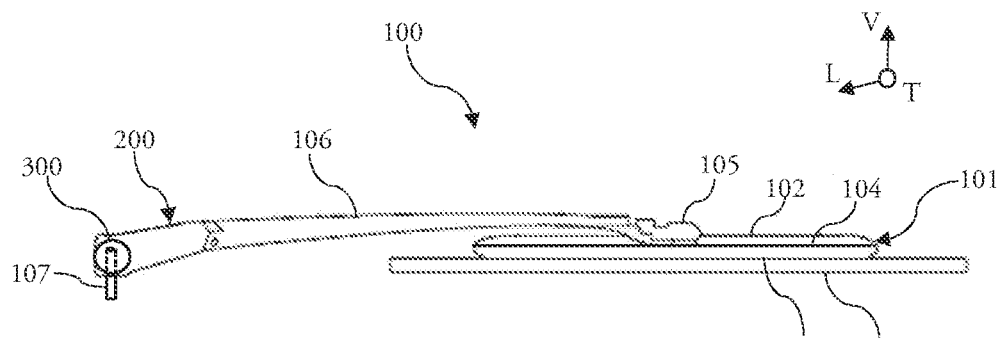
FIG. 1 is a schematic representation of a wiper system comprising a connection assembly according to the present invention.

With reference to FIG. 1, a motor vehicle is commonly provided with a wiper system 100 for removing water and/or dirt present on a glazed surface 1, in particular a motor vehicle rear window or windscreen. The wiper system 100 comprises a windscreen wiper 101 that comprises at least one air deflector 102 and a wiper blade 103 connected to each other by a structural element 104 of the windscreen wiper 101, the windscreen wiper not being provided with spreaders. Such a structural element 104 can for example be formed by a single bending member, or by a plurality of bending members, or by a holder into which one or more bending members are threaded.

The air deflector 102 is capable of converting a pressure applied by an air stream flowing along the glazed surface 1 into a force pressing the windscreen wiper 101 against the glazed surface 1 of the motor vehicle. The wiper blade 103 is the part of the windscreen wiper 101 in direct contact with the glazed surface 1, and it is configured to remove the water and/or dirt present thereon. According to the example shown, the air deflector 102, the wiper blade 103 and the structural element 104 form a semi-rigid assembly held by a fixing device 105, inserted between a drive arm 106 and the windscreen wiper 101. Alternatively, provision can be made for the windscreen wiper to be directly connected to the drive arm.

The drive arm 106 is suitable for performing an angular back-and-forth movement along the glazed surface 1, carrying the windscreen wiper 101 with it. According to the invention, the drive arm 106 is rotatably connected to a drive shaft 107 of the vehicle by a connection assembly 200 according to the present invention. As will be described in greater detail below, this connection assembly 200 comprises at least one fixing device that provides the mechanical connection between the drive arm 106 and the drive shaft 107, and a cover rotatably mounted on the fixing device, the cover being arranged on top of the fixing device when the connection assembly is incorporated into the wiper system. In addition to performing an aesthetic function, the cover makes it possible to protect a fixing zone 300 between the fixing device and the drive shaft 107. According to the invention, a pivoting connection is thus made between the fixing device and the cover of the connection assembly 200. As will be described in greater detail below, this pivoting connection comprises at least one trunnion received in a bore.

Figure 2:
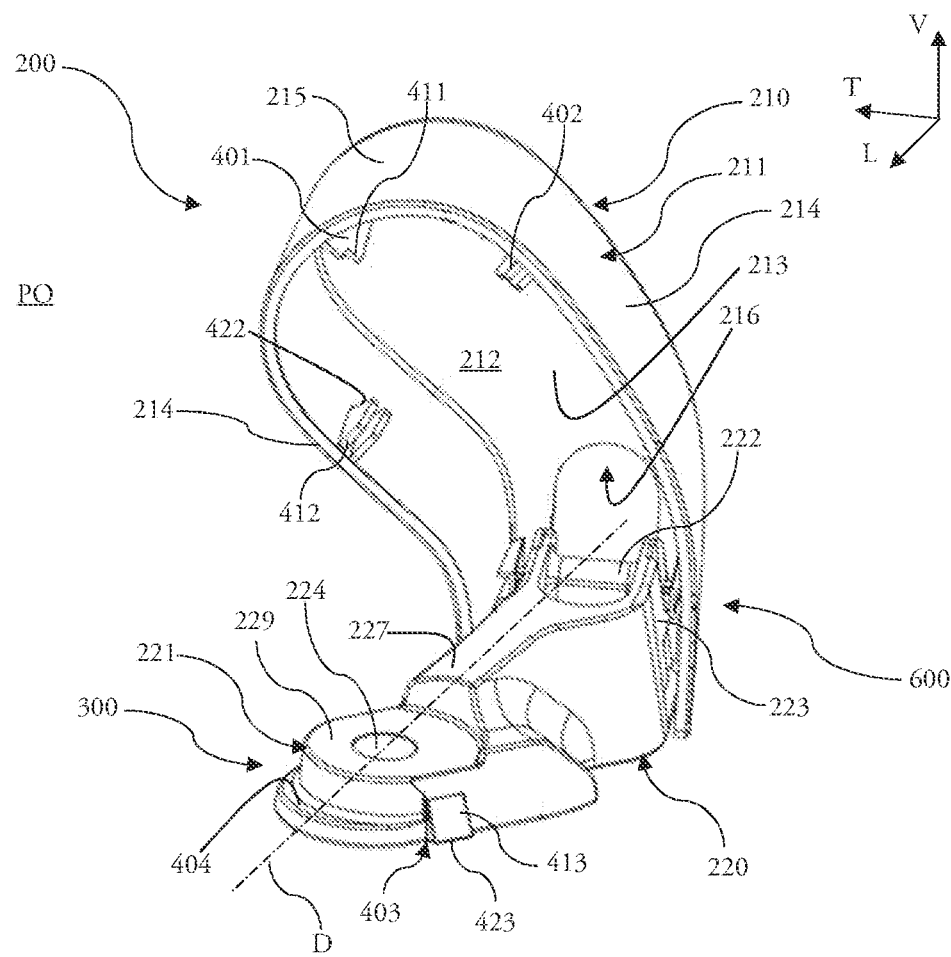
FIG. 2 is a top perspective view of the connection assembly according to the present invention comprising a fixing device and a cover, the cover being shown in an open position.
Figure 3:
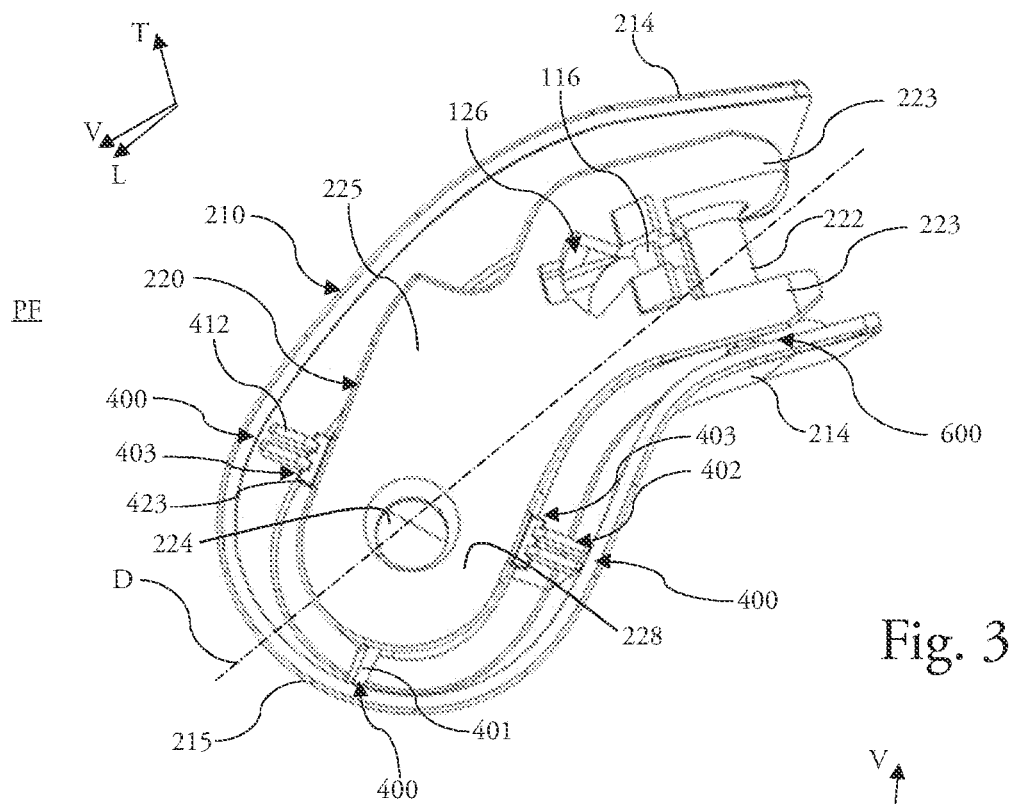
FIG. 3 is a bottom perspective view of the connection assembly according to the present invention in which the cover is shown in a closed position.

The cover 210 is thus mobile relative to the fixing device 220 and it can thus adopt an open position PO or a closed position PF shown in FIGS. 2 and 3 respectively. The open position PO of the cover 210 corresponds to a position in which the fixing zone 300 between the fixing device 220 and the drive shaft 107 is accessible and the closed position PF of this cover 210 corresponds to a position in which the cover 210 covers the fixing zone 300 between the fixing device 220 and the drive shaft 107.

It will be understood that the wiper system 100 described above is only an example and that the connection assembly 200 according to the present invention can be used on any type of wiper system, for example a wiper system in which the drive arm is connected to the windscreen wiper by spreaders, i.e. a wiper system not provided with the structural element 104.

The connection assembly 200 according to the present invention will now be described with reference to FIGS. 2 and 3, FIG. 2 being a top perspective view of the connection assembly 200 when the cover 210 is in its open position PO and FIG. 3 being a bottom perspective view of the connection assembly 200 when the cover 210 is in its closed position PF.

The fixing device 220 makes it possible to create a mechanical connection between the drive arm and the drive shaft and comprises to this end at least one bearing 221 configured to receive the drive shaft and at least one shaft 222 onto which the drive arm can be fixed. As shown, the fixing device 220 extends mostly in a main direction of extension D parallel to the longitudinal axis L of the three-dimensional reference system, the bearing 221 and the shaft 222 being opposite each other along this main direction of extension D.

As shown in FIGS. 2 and 3, the shaft 222 extends between two side walls 223 of the fixing device 220, and in a direction perpendicular, or substantially perpendicular, to the main direction of extension D of this fixing device 220, i.e. parallel to the transverse axis T of the three-dimensional reference system shown. These side walls 223 also hold at least part of the pivoting connection 600 made between the fixing device 220 and the cover 210. The two side walls 223 of the fixing device 220 are connected to each other by a lower wall 225 and by an upper wall 227, the lower wall 225 facing towards the glazed surface when the connection assembly 200 is incorporated into the vehicle and the upper wall 227 facing towards the cover 210. It will be noted in FIGS. 2 and 3 that a lower face 228 of the bearing 221 extends in the same longitudinal and transverse plane as the lower wall 225 of the fixing device 220. Conversely, a plane that contains an upper face 229 of the bearing 221 and a plane that contains most of the upper wall 227 of the fixing device 220 are different, the plane containing the upper face 229 of the bearing 221 being positioned beneath the plane that contains most of the upper wall 227 of the fixing device 220.

As shown, an orifice 224 is made in the bearing 221 and it will be understood that the drive shaft of the vehicle is intended for being received in this orifice 224. When the connection assembly 200 according to the invention is to be fixed to the drive shaft, it will be understood that this drive shaft is thus inserted into the orifice 224 made in the bearing 221 of the connection device 220 from below, i.e. the orifice 224 opens onto the lower face 228 of the bearing 221 and the drive shaft is inserted into the bearing 221 through this lower face 228. Once the drive shaft has been inserted into the orifice, at least one fixing means is added, in order to hold the drive shaft in position in this orifice 224. In other words, the bearing 221 of the fixing device 220, and more particularly the orifice 224 made in this bearing 221, contributes to forming the fixing zone 300 between the fixing device 220 and the drive shaft. According to the example shown here, the bearing 221 is circular, but it could have any other shape without departing from the scope of the present invention.

As shown in FIG. 3, the connection device 220 also comprises a rod 116 that extends substantially parallel to the shaft 222 between the two side walls 223 of the fixing device 220. This rod 116 is intended for receiving a hook of an elastic return device configured to press the windscreen wiper against the glazed surface to be cleaned. In other words, in the example shown here, this elastic return device exerts a force pressing on the windscreen wiper by means of the structural element that makes it possible to distribute this force over an entire length of this windscreen wiper. It will also be noted that a cutout 126 is made in the lower wall 225 of the fixing device 220, around this rod 116. It will be understood that this cutout 126 is configured to permit the assembly of the hook of the elastic return device on the rod 116.

The cover 210 extends obliquely relative to the main direction of extension D of the fixing device 220 when it is in its open position PO and in a direction substantially parallel to the main direction of extension D of the fixing device 220 when it is in its closed position PF. This cover 210 comprises a peripheral wall 211 that defines an inner volume 212 of this cover 210. Seen from below, this peripheral wall 211 has a U shape partially closed by a bottom wall 213. In other words, the cover 210 comprises at least two branches 214 connected to each other by a base 215 and the bottom wall 213. As shown, the bottom wall 213 has a recess 216 that makes it possible to leave the shaft 222 of the fixing device 220 intended for receiving the drive arm accessible. It will therefore be understood that the drive arm can be changed at any time without any operation being necessary on the cover 210. The branches 214 of the cover 210 are arranged on either side of the side walls 223 of the fixing device 220 and hold at least part of the pivoting connection 600 made between the cover 210 and the fixing device 220. In other words, the cover 210 is hinged relative to the fixing device 220 in a zone in which the branches 214 of the cover 210 and the side walls 223 of the fixing device 220 overlap.

As mentioned above, the cover 210 can adopt the open position PO, shown in FIG. 2, in which the fixing zone 300 between the fixing device 220 and the drive shaft is accessible, and a closed position PF, shown in FIG. 3, in which the cover 210 totally covers at least this fixing zone 300 in particular so as to protect this fixing zone 300 and prevent the fixing device 220 from detaching from the drive shaft. Advantageously, the inner volume 212 of the cover 210 is thus configured to make it possible to close the cover 210 down on the fixing device 220. According to one example shown here, this inner volume 212 is suitable for containing the entire fixing device 220.

The connection assembly 200 according to the present invention also comprises at least one device for locking the open position PO of the cover 210. According to the invention, the locking of the open position PO of the cover 210 due to the locking device in particular makes the fixing zone 300 accessible without the cover 210 having to be held by an operator, thus facilitating the positioning of the fixing means making it possible to fix the fixing device 220 onto the drive shaft of the vehicle. As will be described in greater detail below with reference to FIGS. 4 to 9, the locking device is made on the pivoting connection 600 made between the fixing device 220 and the cover 210.

The connection device 200 according to the invention also comprises means 400 for locking the closed position PF of the cover 210 that makes it possible to protect the fixing zone 300, regardless of the speed of travel of the vehicle on which such a connection assembly 200 is mounted. According to the example shown here, the locking means 400 comprise a first rib 401 and second ribs 402 made on the cover 210, and at least two spurs 403 configured to form a stop for the two second ribs 402, together with a bearing surface 404 intended for receiving the first rib 401.

As shown, all three of the first rib 401 and the second ribs 402 extend in the inner volume 212 of the cover 210. The first rib 401 comprises a notch 411 intended for stopping against the bearing surface 404 mentioned above. This bearing surface 404 extends around a perimeter of the bearing 221, so that the first rib 401 can be made at any point of the base 215 of the U shape of the cover 210. Advantageously, the engagement of the notch 411 made in the first rib 401 with the bearing surface 404 makes it possible to limit a downwards movement of the cover 210, i.e. a movement that makes it possible to close this cover 210 down on the fixing device 220. According to the example shown here, this bearing surface 404 is flat but it could also be uneven, and for example have a detent for receiving the notch made in the first rib without departing from the scope of the present invention.

The two second ribs 402 are identical and are made on one of the branches 214 of the U shape of the cover 210 respectively. According to the example shown here, the locking means 400 more particularly comprise four second ribs 402 distributed in pairs on each of the branches 214 of the cover 210. All of these second ribs 402 are identical and the description that follows for one of them can thus be transposed directly to the other three. Similarly, the reference made to one of these second ribs 402 can also be transposed directly to the other three.

These two ribs 402 have at least one bevelled lower edge 412, i.e. an edge of each of these ribs 402 facing towards the fixing device 220 when the cover 210 is in its open position PO has a bevel. Each rib 402 also has at least one upper edge 422 facing towards the bottom wall 213 of the cover 210. At least two spurs 403 are also made on the fixing device 220, for example close to the bearing 221. Here, "close to the bearing 221" is given to mean the fact that each spur 403 is made closer to the bearing 221 than to the shaft 222. Each of these spurs 403 comprises at least one sloped wall 413 and at least one horizontal wall 423 that extends mostly in a plane that contains the longitudinal axis L and the transverse axis T of the three-dimensional reference system shown. More particularly, this horizontal wall 423 extends in the same longitudinal and transverse plane as the lower face 228 of the bearing 221 and as the lower wall 225 of the fixing device 220. Thus, when the cover 210 is closed down from its open position PO to its closed position PF, the bevels of the lower edges 412 of the second ribs 402 slide against the sloped wall 413 of one of the spurs 403, then the upper edge 422 of the second rib 402 in question stops against the horizontal wall 423 of the spur 403 in question. According to the example shown, two second ribs 402 stop against each spur 403. It will be understood that the engagement of the upper edges 422 of the second ribs 402 with the horizontal wall 423 of the spurs 403 makes it possible to prevent the cover 210 from opening at an untimely moment, i.e. moving from its closed position PF to its open position PO. Thus, the first and second ribs 401, 402, the spurs 403 and the bearing surface 404 jointly form the means 400 of locking the closed position PF of the cover 210.

As mentioned previously, the pivoting connection 600 that comprises at least one trunnion received in at least one bore and is made between the fixing device 220 and the cover 210 also holds the device for locking the open position PO of the cover 210. In other words, the at least one trunnion and the at least one bore are distributed between the fixing device 220 and the cover 210 and respectively hold at least one element contributing to the device for locking the open position PO of the cover 210.

Figure 4:
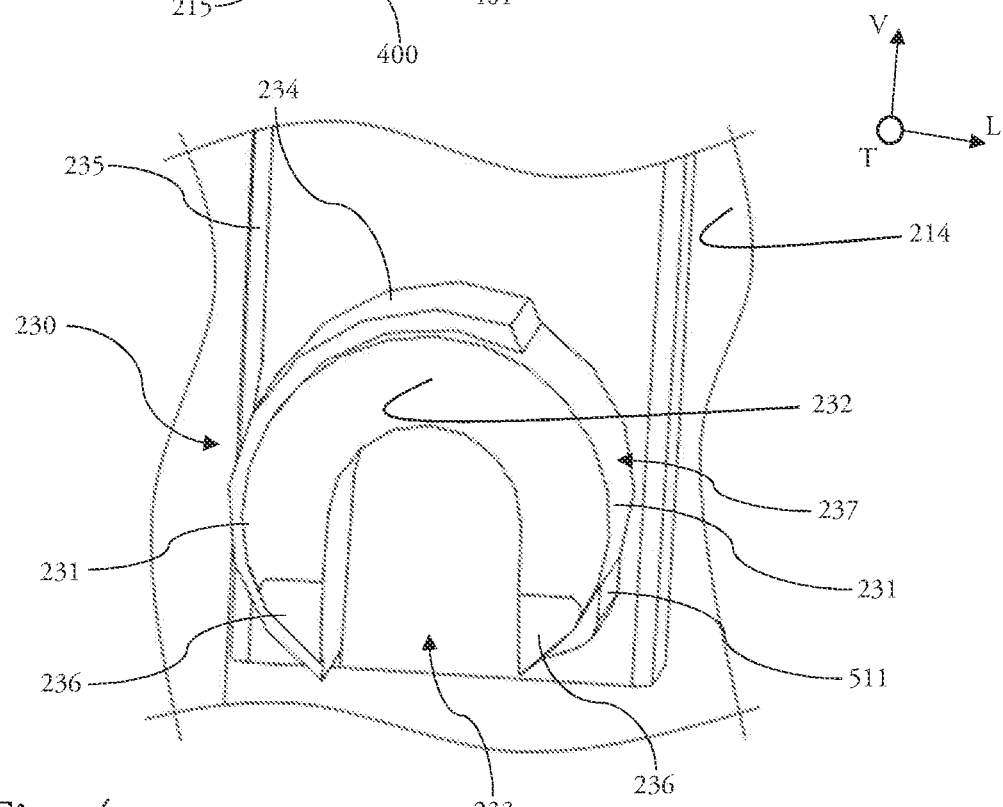
FIG. 4 shows a transverse cross-section of the cover of the connection assembly according to a first embodiment of the present invention.
Figure 5:
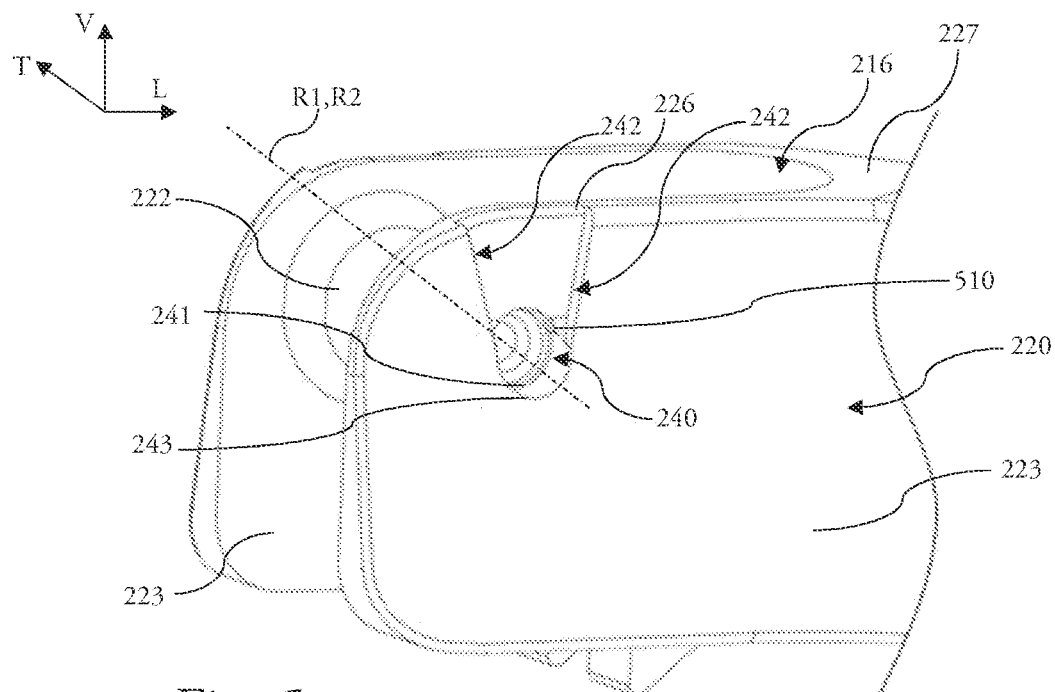
FIG. 5 is a partial representation of the fixing device of the connection assembly according to the first embodiment of the present invention.
Figure 6:
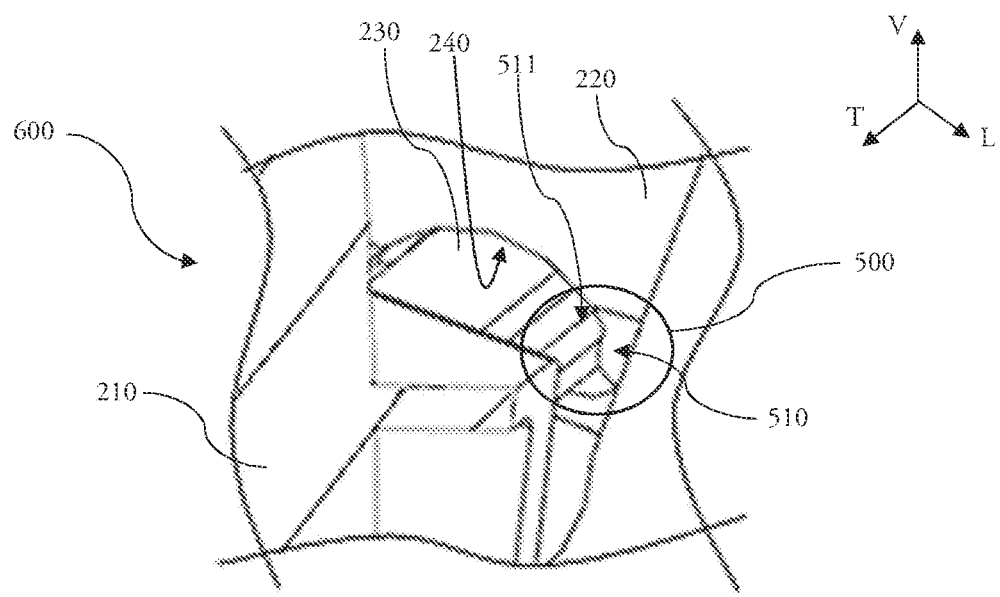
FIG. 6 is a perspective view of a pivoting connection made between the fixing device and the cover shown in FIGS. 4 and 5, when the cover is in the open position.
Figure 7:
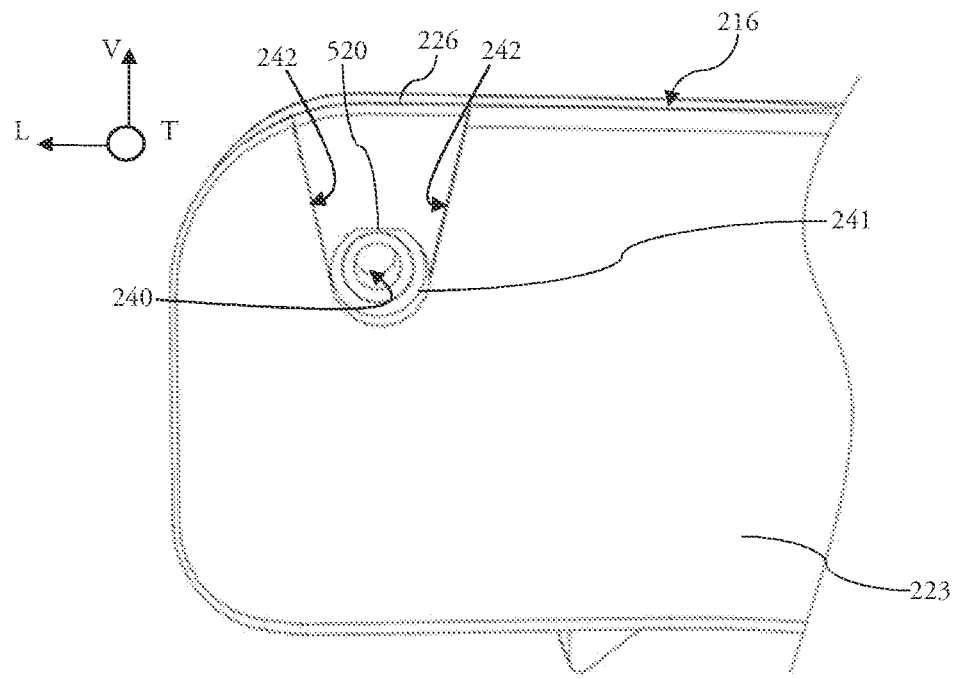
FIG. 7 is a partial representation of the fixing device of the connection assembly according to a second embodiment of the present invention.
Figure 8:
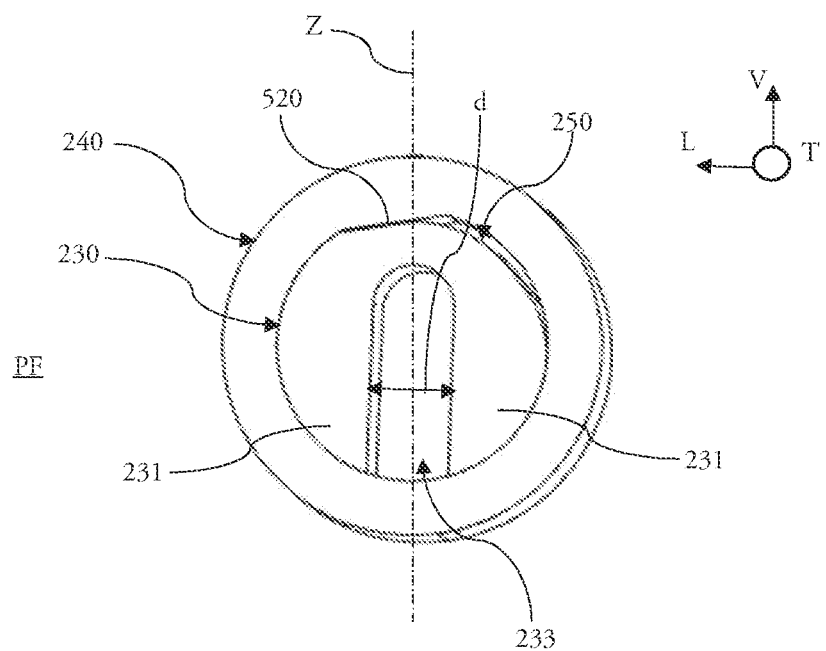
FIGS. 8 and 9 are longitudinal cross-sectional views of a pivoting connection made between the fixing device and the cover according to the second embodiment of the present invention, when the cover is in the closed position and when the cover is in the open position respectively.
Figure 9:
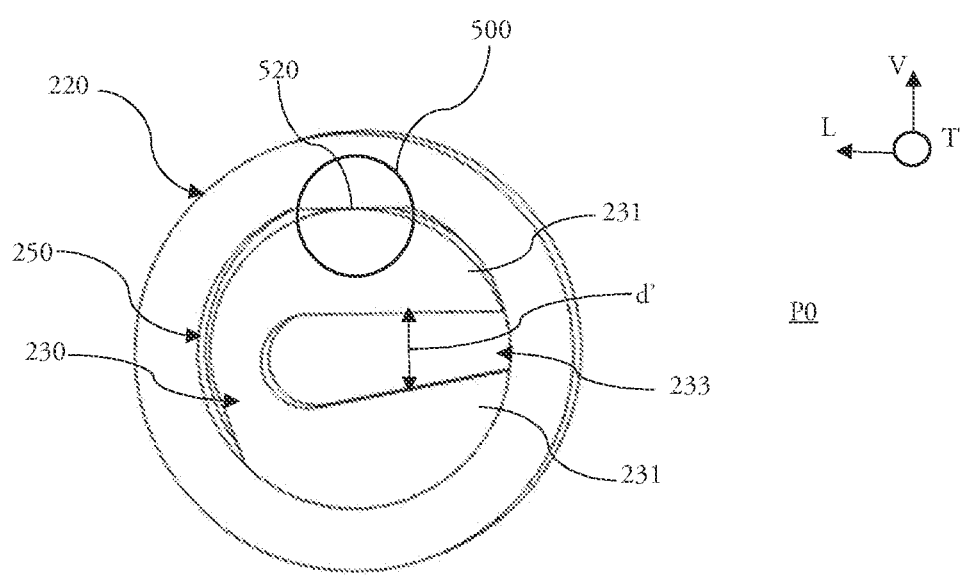

FIGS. 4 to 6 thus show a first embodiment of this pivoting connection 600 and therefore of the device for locking the open position PO of the cover 210 and FIGS. 7 to 9 show a second embodiment of this pivoting connection 600 and therefore of the device for locking the open position PO of the cover. The features common to these two embodiments will first be described, followed by a description of the specific features of each of them.

According to the examples shown here, the pivoting connection 600 comprises at least two trunnions 230 made on the cover 210, one of these trunnions 230 for example being shown in FIG. 4. According to the examples shown here, the two trunnions 230 are identical, which means that the description given below relating to one of them can be transposed directly to the other.

As partially shown, the trunnion 230 emerges from a base 235 integrally formed with one of the branches 214 of the cover 210 and extends along a main axis of extension parallel to the transverse axis T of the three-dimensional reference system. In other words, the trunnions 230 extend from the branches 214 of the cover 210, towards each other, and in the inner volume of this cover 210. These trunnions 230 are also C-shaped when seen from the inner volume of the cover 210, and thus comprise at least two deformable prongs 231 connected to each other by a bridge of material 232. More specifically, these prongs 231 are elastically deformable, i.e. they are configured to return to their initial position after they have been deformed. Thus, each trunnion 230 has a slot 233 that makes it possible to form the prongs 231 and also gives these prongs 231 elasticity. As shown, the ends 236 of the prongs 231 each have a bevel, i.e. the ends 236 have an oblique shape when seen from the side. This particular shape makes it possible in particular to facilitate the insertion of the trunnions into the bores 240 of the pivoting connection.

According to the examples shown here, these bores 240 are made in the fixing device 220, and more particularly one bore 240 is made in each side wall 223 of this fixing device 220, facing the shaft 222 intended for receiving the drive arm. These bores 240 are for example shown in FIGS. 5 and 7. For example, the two bores 240 of the fixing device 220 can communicate, at least partially, by means of this shaft 222, which in this case is hollow. As shown, these bores 240 have a substantially cylindrical shape, an axis of revolution R1 of one of the bores 240 being, according to the examples shown here, aligned with an axis of revolution R2 of the other bore, these axes of revolution R1, R2 being parallel to the transverse axis T of the three-dimensional reference system. In addition, each side wall 223 that holds one of the bores 240 has at least two cutaways 242 made obliquely from an upper edge 226 of the side wall 223 in question, i.e. an edge of this side wall 223 facing towards the cover 210 when it is mounted on the fixing device 220 to an opening 243 of the bore 240 through which the trunnion in question can be inserted into the bore. It will be understood that these cutaways 242 facilitate the insertion of the trunnion 230 into the bore 240 in question, in particular by forming a guide for the insertion of the trunnion 230 into the bore 240.

It will also be noted that, according to any one of the embodiments shown here, an inner perimeter of the bores 240 is constant while an outer perimeter of the trunnions 230 is not. More particularly, each trunnion 230 comprises at least one block 234 arranged on a portion of its outer perimeter, this block 234 for example being visible in FIG. 4. Here, "block" is given to mean an element with a predefined thickness that follows the shape of the trunnion 230 on which it is positioned. These blocks 234 are configured to press against a shoulder 241 made in each bore 240, this shoulder 241 thus forming a guide for the block 234 in question. As mentioned, these blocks 234 only extend over a portion of the outer perimeter of each trunnion 230 so that when a trunnion 230 is inserted into a bore 240, a space 250 is delimited between the outer perimeter of the trunnion 230 and the inner perimeter of the bore 240, and more specifically between a zone 237 of the outer perimeter of the trunnion 230 not provided with a block 234 and the inner perimeter of the bore that faces this zone 237 of the outer perimeter of the trunnion 230 not provided with a block 234. In other words, the zone 237 of the trunnion 230 not provided with a block 234 at least partially defines the space 250. This space 250 can for example be seen in FIGS. 8 and 9. Although this space 250 is only shown in FIGS. 8 and 9, this space 250 is delimited regardless of the embodiment of the present invention. According to the example shown in FIGS. 4 to 6, this space is partially delimited by the block 234, but it will be understood that this is just an example and any other means could be envisaged without departing from the scope of the invention. For example, as shown in FIGS. 8 and 9, a cavity is formed on the outer perimeter of the trunnion and/or on the inner perimeter of the bore, and a bottom of this cavity then defines this space. As will be described in greater detail below, this space 250 enables the trunnion 230 to rotate in the bore 240 that receives it until the open position PO of the cover 210 is locked.

The first embodiment of the present invention will now be described with reference to FIGS. 4 to 6. According to this first embodiment, the device 500 for locking the open position PO of the cover 210 comprises at least one stop 510 made on the inner perimeter of at least one of the bores 240, advantageously on the inner perimeter of the two bores 240, and a second stop 511 made on the outer perimeter of at least one of the trunnions 230, advantageously on the outer perimeter of the two trunnions 230.

As shown in FIGS. 4 and 5, the first stop 510 is formed by a first boss made on the inner perimeter of the bore 240 and the second stop 511 is formed by a second boss made on the outer perimeter of the trunnion 230. Here, "boss" is given to mean a deformation of material, i.e. a deformation of the inner perimeter of the bore or a deformation of the outer perimeter of the trunnion. The first boss is thus integrally formed with the inner perimeter of the bore 240 and the second boss is integrally formed with the outer perimeter of the trunnion 230, i.e. the first boss and the inner perimeter of the bore form an inseparable single assembly and the second boss and the outer perimeter of the trunnion 230 form another inseparable single assembly.

As shown, the first boss made on the inner perimeter of the bore extends from an edge that defines the opening 243 of the bore 240 to the shoulder 241 made on the inner perimeter of this bore 240, this first boss extending parallel to the axis of revolution R1, R2 of the bore 240 in question. The second boss is formed on one of the prongs 231 of the trunnion 230 in question, and more specifically close to the end 236 of this prong 231. Here, "close to" is given to mean the fact that the second boss is made closer to this end 236 than to the bridge of material 232 that connects the prongs 231 of this trunnion 230.

FIG. 6 is a perspective view of the pivoting connection 600 according to the first embodiment of the present invention. FIG. 6 thus shows the engagement of the first stop 510 and the second stop 511 of the device 500 for locking the open position PO of the cover 210. "Engagement" is given to mean the fact that the first stop 510 passes over the second stop 511, due to the rotation of the trunnion 230 in the bore 240, and then this first stop 510 presses against the second stop 511. In other words, it will be understood that the first stop 510 forms a stop for the second stop 511 and vice versa, thus providing the locking of the open position PO of the cover 210. In addition, as mentioned previously, the prongs 231 of the trunnions 230 on which the second stop 511 is made are elastically deformable. Thus, when the first stop 510 and the second stop 511 engage, these prongs 231 move apart from each other and then tend to move back together, i.e. return to their initial position, thus increasing the locking of the open position PO of the cover 210.

The second embodiment of the present invention shown in FIGS. 7 to 9 will now be described in greater detail, FIGS. 8 and 9 respectively showing the pivoting connection 600 when the cover 210 is in a closed position PF and the pivoting connection 600 when the cover 210 is in an open position PO.

According to this second embodiment of the present invention, the locking device 500 comprises a flat section 520 formed on the inner perimeter of at least one of the bores 240, advantageously on the inner perimeters of the two bores 240, and one of the prongs 231 of at least one of the trunnions 230, advantageously one of the prongs 231 of each of the trunnions 230. The trunnions 230 of the pivoting connection 600 according to the second embodiment (not shown here) differ from the trunnions of the pivoting connection 600 according to the first embodiment in particular in that they are not provided with the second stop 511 or the block 234. However, as mentioned previously, it will be noted that the inner perimeter of the bore 240 is larger than the outer perimeter of the trunnion 230, so that the space 250 facilitating the rotation of the trunnion 230 in the bore 240 is nonetheless generated.

As shown in FIG. 7, the flat section 520 is formed on an upper portion of the inner perimeter of the bore 240, i.e. a portion of this inner perimeter facing towards the upper edge 226 of the side wall 223 in which this bore 240 is made. It will also be noted in FIG. 8 that, when the cover 210 is in the closed position PF, a straight line Z that intersects the flat section 520 also passes between the prongs 231 of the trunnion 230 in question, i.e. this straight line Z passes through the slot 233 of the trunnion 230. When the cover 210 is moved from its closed position PF to its open position PO, the trunnion 230 rotates until the flat section 520 is exerting sufficient pressure on one of the prongs 231 of this trunnion 230 to bring the two prongs 231 of this trunnion 230 towards each other and thus lock, by friction, the open position PO of the cover 210. This open position PO of the cover 210 is for example shown in FIG. 9.

As previously described, at least one of the prongs 231 of the trunnion 230, advantageously the two prongs 231 of this trunnion 230, have a certain elasticity that enables them to deform and then return to their initial position. It will thus be understood that when the trunnion 230 pivots in the bore 240, in particular due to the space 250 delimited between the outer perimeter of the trunnion 230 and the inner perimeter of the bore 240 that receives this trunnion 230, the prongs 231 of the trunnion 230 move towards each other progressively. In addition, as the prongs 231 of the trunnion 230 are at least partially elastic, they tend, once they have been brought towards each other, to return to their original position, so that the trunnion 230 is thus wedged in the bore 240. The elasticity of the prongs 231 of the trunnion 230 thus makes it possible to lock by friction the open position of the cover 210, this locking being progressive and reversible. "Bringing the prongs 231 towards each other" is given to mean the fact that a distance d measured between a point on one prong and a point on another prong when the cover 210 is in the closed position PF is greater than a distance d' measured between the same points when the cover 210 is in its open position PO.

The locking device 500 according to the second embodiment of the present invention thus comprises the flat section 520 made on the inner perimeter of the bore(s), and at least one of the prongs 231 of the trunnion(s) 230 received in this/these bore(s).

The present invention thus proposes simple, low-cost means making it possible to lock in particular the open position of a cover of a wiper system connection assembly in order to facilitate access to a fixing zone between a fixing device of this connection assembly and a drive shaft of a vehicle, and thus facilitate the positioning of fixing means making it possible to rigidly connect the fixing device to the drive shaft.

The present invention is not however limited to the means and configurations described and shown herein, and also extends to any equivalent means and configurations and any technically feasible combination of such means. In particular, the form and arrangement of the components of the device for locking the open position of the cover can be modified without detracting from the invention, provided that they perform the functions described in the present document.

The invention claimed is:

1. A connection assembly for connecting a windscreen wiper drive arm to a vehicle drive shaft, the connection assembly comprising:
at least one fixing device configured to rotatably connect the windscreen wiper drive arm to the vehicle drive shaft;
at least one cover mounted pivotably on the at least one fixing device by a pivoting connection, the at least one cover being configured to adopt a closed position in which the at least one cover prohibits access to a fixing zone between the at least one fixing device and the vehicle drive shaft or an open position in which the at least one cover permits access to the fixing zone between the at least one fixing device and the vehicle drive shaft,
the pivoting connection comprising at least one bore and at least one trunnion received in the at least one bore; and
at least one locking device for locking the open position of the at least one cover, the at least one locking device being arranged on an inner perimeter of the at least one bore and on an outer perimeter of the at least one trunnion,
wherein the at least one trunnion comprises at least two deformable prongs connected to each other by a bridge of material.

2. The connection assembly according to claim 1, in which the at least one trunnion is made on the at least one cover and in which the at least one bore is made in the at least one fixing device.

3. The connection assembly according to claim 1, in which a block is made on at least part of the outer perimeter of the at least one trunnion, a zone of the outer perimeter of the at least one trunnion not provided with this block at least partially defining a space made between the outer perimeter of the at least one trunnion and the inner perimeter of the at least one bore.

4. The connection assembly according to claim 1, in which the at least one locking device comprises at least one first stop made on the inner perimeter of the at least one bore and at least one second stop made on the outer perimeter of the at least one trunnion.

5. The connection assembly according to claim 4, in which the at least one second stop is made at one end of at least one of the at least two deformable prongs of the at least one trunnion.

6. The connection assembly according to claim 4, in which the at least one first stop is formed by a first boss and in which the at least one second stop is formed by a second boss.

7. The connection assembly according to claim 6, in which the at least one bore has a substantially cylindrical shape and in which the first boss extends parallel to an axis of revolution of the at least one bore, from an edge that defines an opening of the at least one bore through which the at least one trunnion is inserted into the at least one bore.

8. The connection assembly according to claim 6, in which the at least one trunnion emerges from a base from which it extends mostly along a main axis of extension and in which the second boss extends from the base, parallel to the main axis of extension.

9. The connection assembly according to claim 1, in which the at least one locking device comprises at least one flat section made on the inner perimeter of the at least one bore, and at least one of the at least two deformable prongs of the at least one trunnion, the at least one flat section being configured to press against this at least one prong.

10. The connection assembly according to claim 9, in which a pressure of the at least one flat section on at least one of the at least two deformable prongs of the at least one trunnion brings the at least two deformable prongs of the at least one trunnion towards each other.

11. The connection assembly according to claim 9, in which when the at least one cover is in the closed position, at least one straight line intersecting the at least one flat section passes between the at least two deformable prongs of the at least one trunnion.

12. A wiper system comprising:
   at least one windscreen wiper for coming into contact with a glazed surface of a motor vehicle; and
   at least one drive arm configured to rotate the at least one windscreen wiper, wherein the at least one drive arm is connected to a drive shaft of the motor vehicle by a connection assembly according to claim 1.

* * * * *

UNITED STATES PATENT AND TRADEMARK OFFICE
CERTIFICATE OF CORRECTION

| | |
|---|---|
| PATENT NO. | : 11,110,897 B2 |
| APPLICATION NO. | : 16/524988 |
| DATED | : September 7, 2021 |
| INVENTOR(S) | : Richard Charbonnier et al. |

It is certified that error appears in the above-identified patent and that said Letters Patent is hereby corrected as shown below:

On the Title Page

Item (65) Prior Publication Data, after Line 2, insert:
-- (30) Foreign Application Priority Data
July 30, 2018 (FR) 1857068 --.

Signed and Sealed this
Twenty-first Day of June, 2022

Katherine Kelly Vidal
*Director of the United States Patent and Trademark Office*